US012618347B2

(12) United States Patent
Dean

(10) Patent No.: US 12,618,347 B2
(45) Date of Patent: May 5, 2026

(54) HYBRID VEHICLE RAPID CATALYST EXHAUST COOLING

(71) Applicant: FCA US LLC, Auburn Hills, MI (US)

(72) Inventor: Benjamin Dean, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 229 days.

(21) Appl. No.: 18/459,535

(22) Filed: Sep. 1, 2023

(65) Prior Publication Data

US 2025/0075648 A1 Mar. 6, 2025

(51) Int. Cl.
| | |
|---|---|
| *F01N 3/05* | (2006.01) |
| *B60W 20/00* | (2016.01) |
| *B60W 50/02* | (2012.01) |
| *F02D 41/02* | (2006.01) |

(52) U.S. Cl.
CPC .............. *F01N 3/05* (2013.01); *B60W 20/00* (2013.01); *B60W 50/0225* (2013.01); *F02D 41/0235* (2013.01); *B60W 2510/0676* (2013.01); *B60W 2710/0644* (2013.01); *F02D 2041/0265* (2013.01); *F02D 2200/021* (2013.01)

(58) Field of Classification Search
CPC .................................. F01N 3/05; B60W 20/00
See application file for complete search history.

(56) References Cited

U.S. PATENT DOCUMENTS

| | | | | |
|---|---|---|---|---|
| 9,537,193 | B2 * | 1/2017 | Ogawa ................ | H01M 10/399 |
| 11,433,878 | B2 * | 9/2022 | Choi ................... | F02D 41/0007 |
| 11,623,634 | B2 * | 4/2023 | Nose .................. | F02D 41/1497 |
| | | | | 701/22 |
| 12,221,002 | B2 * | 2/2025 | Niwa .................... | H02J 7/0042 |
| 2011/0027632 | A1 * | 2/2011 | Higashino ......... | H01M 10/6563 |
| | | | | 429/83 |
| 2017/0080821 | A1 * | 3/2017 | Hughes ................. | B60L 58/25 |
| 2017/0248041 | A1 * | 8/2017 | Lenk ................. | H01M 10/6561 |
| 2018/0201097 | A1 * | 7/2018 | Cosgrove ........... | B60H 1/00778 |
| 2019/0170052 | A1 * | 6/2019 | Dudar ...................... | F02P 9/002 |
| 2020/0247239 | A1 * | 8/2020 | Stoltz ................... | B60W 10/30 |
| 2022/0259825 | A1 * | 8/2022 | Cliff ........................ | B60L 58/14 |

* cited by examiner

*Primary Examiner* — Jess Whittington
(74) *Attorney, Agent, or Firm* — Jeremy J. Klobucar

(57) ABSTRACT

A hybrid electric vehicle (HEV) includes an internal combustion engine and a motor/generator configured to drive the engine or be driven by the engine to generate electricity to charge a high voltage (HV) battery and/or drive an electric traction motor. The HEV includes an exhaust system, a HV system electrically coupling the HV battery and the electric traction motors, and a control system including a controller for monitoring an underhood environment of the HEV and performing a cooling operation to cool the exhaust system. The controller is programmed to determine if a temperature of the underhood environment, the internal combustion engine, and/or the exhaust system is above a predetermined threshold indicating a potential degradation of HV system performance, and operate the internal combustion engine in fuel shut-off to generate a flow of air to the exhaust system for cooling of the exhaust system to thereby cool the HV system.

16 Claims, 3 Drawing Sheets

HYBRID VEHICLE RAPID CATALYST EXHAUST COOLING

FIELD

The present application relates generally to hybrid electric vehicle systems and, more particularly, to systems for rapidly cooling an exhaust system of a hybrid electric vehicle.

BACKGROUND

Many hybrid electric vehicles (HEVs) include both an internal combustion engine and high voltage (HV) components packaged into the underhood environment. However, the engine can produce high underhood temperatures via residual heat from radiator, exhaust and catalyst systems. The HV components may be sensitive to such high temperatures, potentially resulting in reduced performance or functionality. Accordingly, while such conventional systems work well for their intended purpose, there is a desire for improvement in the relevant art.

SUMMARY

In accordance with one example aspect of the invention, a hybrid electric vehicle (HEV) is provided. In one example implementation, the HEV includes an internal combustion engine and a motor/generator configured to drive the internal combustion engine or be driven by the internal combustion engine to generate electricity to charge a high voltage (HV) battery and/or drive one or more electric traction motors. The HEV includes an exhaust system, a HV system electrically coupling the HV battery and the one or more electric traction motors, and a control system including a controller for monitoring an underhood environment of the HEV and performing a cooling operation to cool the exhaust system. The controller is programmed to determine if a temperature of the underhood environment, the internal combustion engine, and/or the exhaust system is above a predetermined threshold indicating a potential degradation of HV system performance, and operate the internal combustion engine in fuel shut-off to generate a flow of air to the exhaust system for cooling of the exhaust system to thereby cool the HV system.

In addition to the foregoing, the described HEV may include one or more of the following features: wherein the controller is further programmed to determine if a plug-in charging rate is being limited due to thermal conditions of the HV system; wherein the controller is further programmed to determine an engine spin speed setpoint to reduce the temperature of the underhood environment, the internal combustion engine, and/or the exhaust system below the predetermined threshold; wherein the controller is further programmed to operate the internal combustion engine in fuel shut-off at the determined engine spin speed setpoint.

In addition to the foregoing, the described HEV may include one or more of the following features: wherein the HV system includes an onboard charger, a plug-in interface, and HV cables; wherein the controller is configured to perform the cooling operation during a plug-in recharging of the HV battery; wherein during the cooling operation, the motor/generator is powered by the HV battery; wherein during the cooling operation, the motor/generator is powered by a grid charger plugged into the plug-in interface; and wherein the HEV is a series hybrid electric vehicle.

In accordance with another example aspect of the invention, a method of operating a hybrid electric vehicle (HEV) is provided. The HEV includes an internal combustion engine, a motor/generator configured to drive the internal combustion engine or be driven by the internal combustion engine to generate electricity to charge a high voltage (HV) battery and/or drive one or more electric traction motors, an exhaust system, and a HV system electrically coupling the HV battery and the one or more electric traction motors.

In one example implementation, the method includes determining, by a controller having one or more processors, if a temperature of an underhood environment, the internal combustion engine, and/or the exhaust system is above a predetermined threshold indicating a potential degradation of HV system performance; and operating, by the controller and the motor/generator, the internal combustion engine in fuel shut-off to generate a flow of air to the exhaust system to perform a cooling operation of the exhaust system to thereby cool the HV system.

In addition to the foregoing, the described method may include one or more of the following features: determining, by the controller, if a plug-in charging rate is being limited due to thermal conditions of the HV system; determining, by the controller, an engine spin speed setpoint to reduce the temperature of the underhood environment, the internal combustion engine, and/or the exhaust system below the predetermined threshold; and operating, by the controller, the internal combustion engine in fuel shut-off at the determined engine spin speed setpoint.

In addition to the foregoing, the described method may include one or more of the following features: wherein the HV system includes an onboard charger, a plug-in interface, and HV cables; wherein the cooling operation is performed during a plug-in recharging of the HV battery; wherein during the cooling operation, the motor/generator is powered by the HV battery; wherein during the cooling operation, the motor/generator is powered by a grid charger plugged into the plug-in interface; and wherein the HEV is a series hybrid electric vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, high underhood temperatures in a hybrid electric vehicle (HEV) may affect the performance and functionality of sensitive high voltage (HV) components. For example, HV cables for DC fast charging can receive high currents, resulting in significant self-heating. Such self-heating may not be an issue when underhood temperatures are low, but with the addition of engine generated heat in the exhaust and catalyst systems, the HV cables can potentially rise above safe levels, causing the vehicle control system to limit the amount of current allowed to flow through the HV cables. This reduction may reduce charge rates and increase charging time.

Accordingly, described herein are systems and methods for rapidly cooling the vehicle underhood environment to improve operation of HV components, for example during DC fast charging while the vehicle is not moving. In one example, the system utilizes an electric motor/generator to spin the engine while in fuel shut-off to push cool, fresh air through the vehicle exhaust system and catalyst(s). This removes heat from the components to accelerate the cooldown time of the underhood environment, for example to improve DC fast charging.

Figure 1:
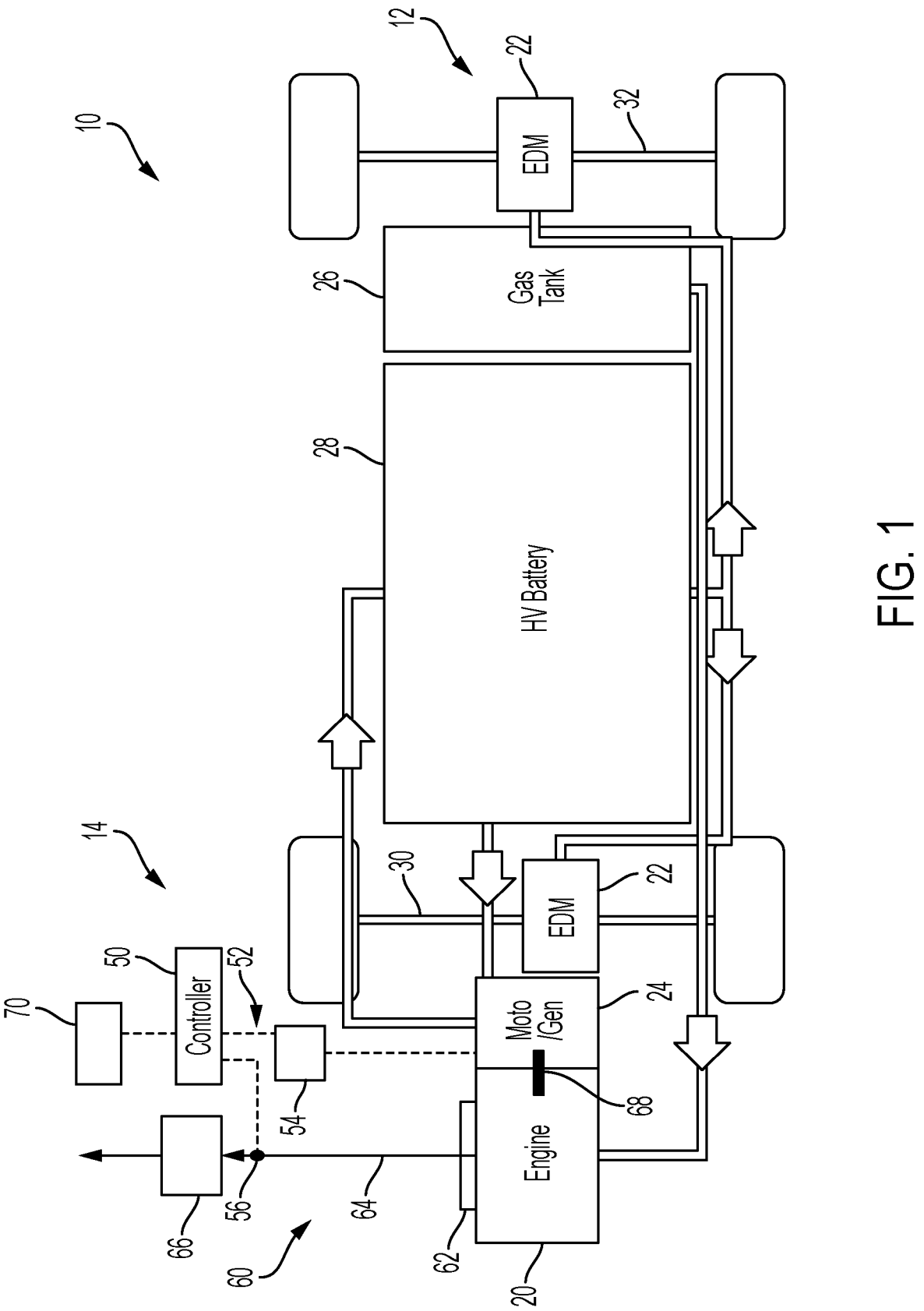
FIG. 1 is a schematic illustration of an example series hybrid electric vehicle architecture in accordance with the principles of the present application.

With initial reference to FIG. 1, a schematic diagram of a series hybrid electric vehicle (HEV) 10 is illustrated having a hybrid powertrain 12 and a powertrain control system 14 according to example implementations of the disclosure. In the illustrated example, the powertrain 12 generally includes an internal combustion engine 20, one or more electric drive modules (EDM) 22, and a motor/generator 24.

The engine 20 receives fuel (e.g., gasoline) from a fuel tank 26 and combusts a mixture of air and fuel within cylinders to drive pistons and generate torque. The generated torque drives the motor/generator 24 to produce electricity to charge a high voltage (HV) battery 28. In other operations, the motor/generator 24 is powered by the HV battery 28 (e.g., via a low voltage battery system) and is also utilized to control engine stop/start operations to improve vehicle fuel economy. The EDMs 22, which include an electric traction motor, are powered by the HV battery 28 to selectively provide drive torque to a front axle 30 and/or a rear axle 32. In this way, the HEV 10 includes a low voltage battery system (not shown) configured to support various 12V loads of the HEV 10, for example, to power various electrical components or start the engine 20, and the high voltage battery 28 is configured to power high voltage loads such as the EDMs 22.

In the example embodiment, the hybrid powertrain 12 is controlled by the powertrain control system 14, which generally includes one or more controllers 50, such as a hybrid control processor (HCP) and/or engine control unit (ECU). The controller 50 is a central supervisory control configured to communicate with various components/modules of the hybrid powertrain 12 via a CAN bus 52. For example, the controller may be in signal communication with a motor control processor (MCP) 54 for control of the motor/generator 24. The controller 50 is also is signal communication with one or more temperature sensors 56 configured to monitor and sense a temperature of an underhood environment 58 (FIG. 2) of the HEV 10, as described herein in more detail.

Figure 2:
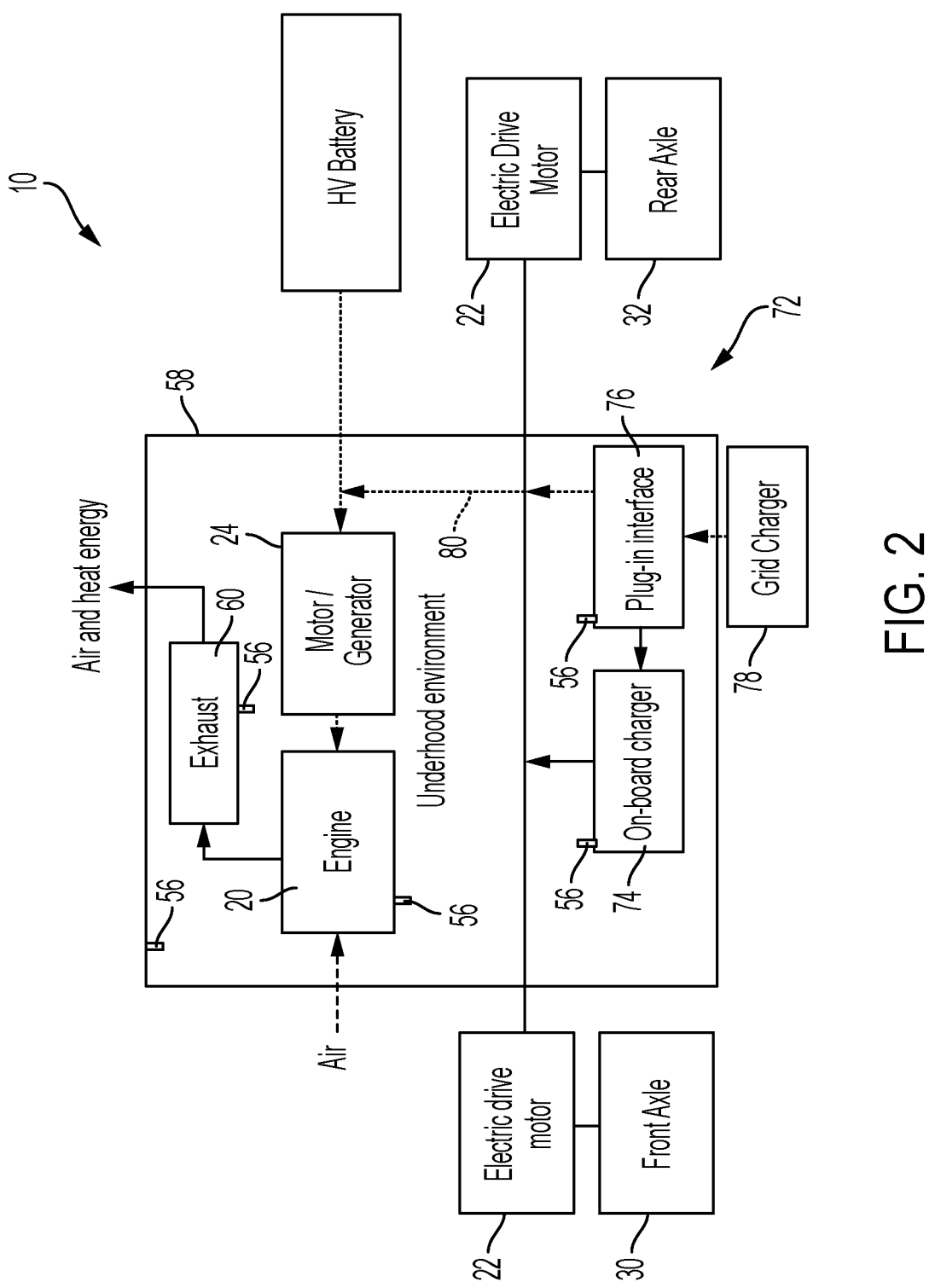
FIG. 2 is a schematic illustration of the hybrid electric vehicle relative to an example underhood environment, in accordance with the principles of the present application.

With continued reference to FIG. 1 and additional reference to FIG. 2, the vehicle underhood environment 58 includes internal combustion engine 20 connected to an exhaust aftertreatment system 60 that generally includes an exhaust manifold 62, an exhaust passage 64, and one or more catalytic converters 66 disposed along the exhaust passage 64 and configured to reduce or convert a desired exhaust gas constituent such as, for example, carbon monoxide (CO), hydrocarbon (HC), and/or nitrogen oxides (NOx). In general, the engine 20 combusts a mixture of fuel and air to drive pistons (not shown) that rotatably turn a crankshaft 68 to generate drive torque. The drive torque is transferred to the motor/generator 24 to generate electricity, which is subsequently stored in the HV battery 28.

The exhaust aftertreatment system 60 also includes an onboard monitoring system 70 in signal communication with the controller 50 to monitor the underhood environment 58. The monitoring system 70 is in communication with the one or more temperature sensors 56 to monitor a temperature of the underhood environment 58, such as exhaust gas in the exhaust system 60, the catalyst 66, or any other suitable location. In this way, controller 50 and monitoring system 70 are configured to monitor the underhood environment 58 to determine if the temperature has exceeded a predetermined threshold indicating that components of a HV system 72 may be affected/degraded. In the example embodiment of FIG. 2, HV components include an onboard charger 74 and a plug-in interface 76 configured to electrically couple to a grid charger 78. The on-board charger 74 is connected to the HV system 72 for charging HV battery 28. The HV system 72 includes HV cables 80 configured to provide power flow between the HV battery 28, the motor/generator 24, the EDM's 22, and various other HV components.

In one example operation, the controller 50 is configured to cool the underhood environment 58, including exhaust system 60 and catalyst 66, to improve HV system performance during plug-in charging when the HEV 10 is not moving. In the example embodiment, controller 50 detects a plug-in charging operation when the grid charger 78 (e.g., a plug) is connected to the plug-in interface 76. The controller 50 determines if a temperature of the underhood environment 58 has exceeded a calibratable, predetermined temperature that could affect performance of the HV system 72. This may be done via signals from the onboard monitoring system 70 and/or temperature sensor(s) 56. If the monitored temperature exceeds the predetermined temperature, controller 50 operates the motor/generator 24 in fuel shut-off to generate a fuel-free flow of air through the exhaust system 60 and catalyst 66 for rapid cooling thereof. The motor/generator 24 may be powered by the HV battery 28 and/or grid charger 78. As such, the underhood temperature is reduced to improve DC fast charging.

Figure 3:
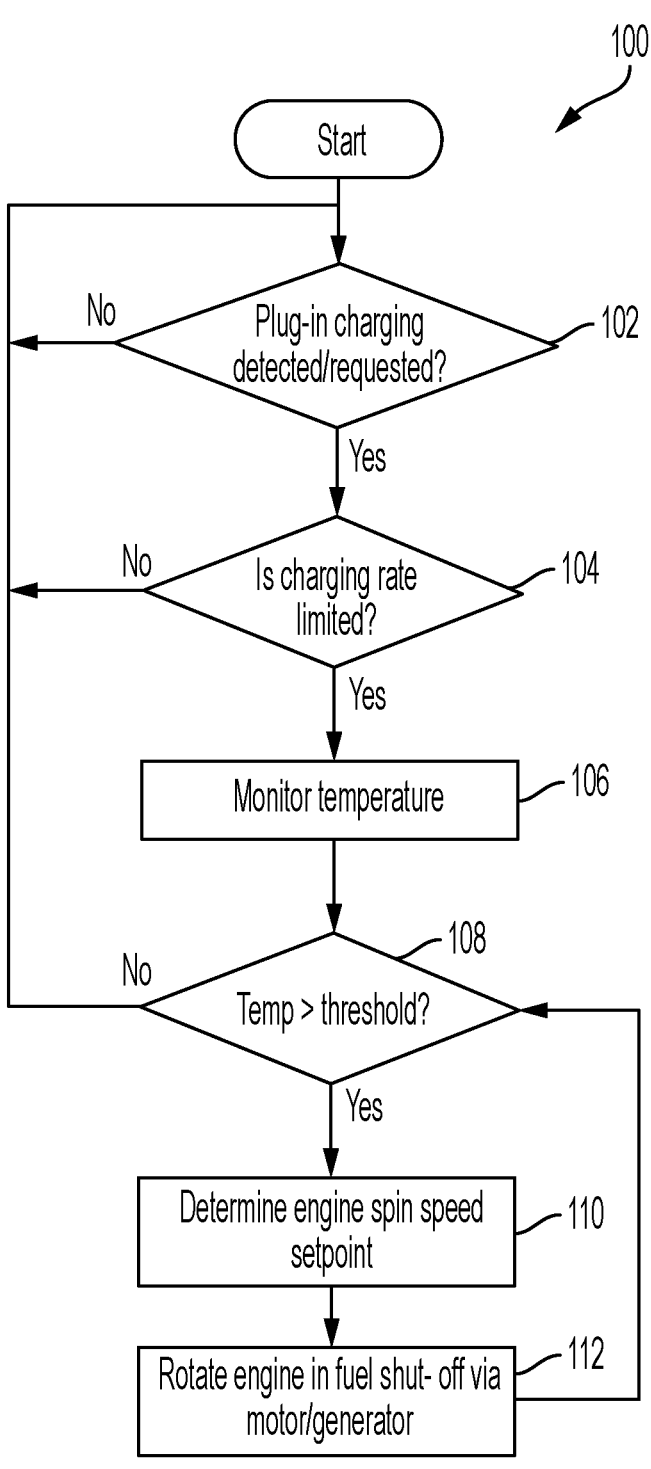
FIG. 3 illustrates an example control logic flow for performing a underhood cooling operation in the series hybrid electric vehicle shown in FIG. 1, in accordance with the principles of the present application.

With reference now to FIG. 3, an example control logic flow 100 for cooling the underhood environment 58 to improve HV system 72 performance is shown. At step 102, controller 50 determines if plug-in charging is detected or requested. This may be determined based on detecting the grid charger 78 is connected to the plug-in interface 76, receiving a user request (e.g., via in-vehicle touchscreen), etc. If no, control returns to step 102. If yes, at step 104 controller 50 determines if a plug-in charging rate is being limited due to thermal conditions of the onboard charger 74, plug-in interface 76, HV bus cables 80, or other component of HV system 72. If no, control returns to step 102. If yes, control proceeds to step 106.

At step 106, controller 50 monitors the temperature of the underhood environment 58 and/or one or more vehicle components such as exhaust temperature in exhaust system 60, a temperature of catalyst 66, and/or a temperature of engine 20 (e.g., engine coolant). Such monitoring may be based on one or more signals from onboard monitoring system 70 and/or temperature sensor(s) 56. At step 108, controller 50 determines if the monitored temperature of the underhood environment 58 and/or component is above a predetermined threshold temperature. If no, control returns to step 102. If yes, control proceeds to step 110.

At step 110, controller 50 determines an engine spin speed setpoint to reduce the monitored temperature to below the predetermined threshold temperature. In one example, the engine spin speed setpoint is based on a lookup table stored in controller 50. For example, higher detected temperatures may require a faster spin speed setpoint, while lower detected temperatures may require a slower spin speed setpoint. At step 112, controller operates the motor/generator 24 to spin the engine 20 (via crankshaft 68) in fuel shut-off at the determined spin speed setpoint. In this way, the engine 20 generates a flow of air (without fuel) through the exhaust passage 64 and catalyst 66 for rapid cooling thereof. Control may then operate the motor/generator for a predetermined time and/or accumulated flow and end, or control may return to step 108.

Described herein are systems and methods for rapidly cooling an underhood environment to improve HV system performance such as during plug-in charging. The system monitors a temperature of one or more underhood components such as the exhaust system and catalyst. If the HV system performance is degraded and/or the monitored temperature is above a predetermined threshold, the system proceeds with a cooling operation and operates the engine in fuel shut-off to generate a flow of air to the exhaust system and catalyst. The airflow is configured to cool the underhood components/environment to thereby improve HV system performance.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A hybrid electric vehicle (HEV), comprising:
an internal combustion engine;
a motor/generator configured to drive the internal combustion engine or be driven by the internal combustion engine to generate electricity to charge a high voltage (HV) battery and/or drive one or more electric traction motors;
an exhaust system;
a HV system electrically coupling the HV battery and the one or more electric traction motors; and a control system including a controller for performing a cooling operation to cool the exhaust system, wherein the controller is programmed to:
determine if a temperature of an underhood environment of the HEV the internal combustion engine, and/or the exhaust system is above a predetermined threshold indicating a potential degradation of HV system performance; and
operate the internal combustion engine in fuel shut-off to generate a flow of air to the exhaust system for cooling of the exhaust system to thereby cool the HV system, wherein the controller is configured to perform the cooling operation during a plug-in recharging of the HV battery.

2. The HEV of claim 1, wherein the controller is further programmed to determine if a plug-in charging rate is being limited due to thermal conditions of the HV system.

3. The HEV of claim 1, wherein the controller is further programmed to determine an engine spin speed setpoint to reduce the temperature of the underhood environment, the internal combustion engine, and/or the exhaust system below the predetermined threshold.

4. The HEV of claim 3, wherein the controller is further programmed to operate the internal combustion engine in fuel shut-off at the determined engine spin speed setpoint.

5. The HEV of claim 1, wherein the HV system includes an onboard charger, a plug-in interface, and HV cables.

6. The HEV of claim 1, wherein during the cooling operation, the motor/generator is powered by the HV battery.

7. The HEV of claim 5, wherein during the cooling operation, the motor/generator is powered by a grid charger plugged into the plug-in interface.

8. The HEV of claim 1, wherein the HEV is a series hybrid electric vehicle.

9. A method of operating a hybrid electric vehicle (HEV) having an internal combustion engine, a motor/generator configured to drive the internal combustion engine or be driven by the internal combustion engine to generate electricity to charge a high voltage (HV) battery and/or drive one or more electric traction motors, an exhaust system, and a HV system electrically coupling the HV battery and the one or more electric traction motors, the method comprising:
determining, by a controller having one or more processors, if a temperature of an underhood environment of the HEV, the internal combustion engine, and/or the exhaust system is above a predetermined threshold indicating a potential degradation of HV system performance; and
operating, by the controller and the motor/generator, the internal combustion engine in fuel shut-off to generate a flow of air to the exhaust system to perform a cooling operation of the exhaust system to thereby cool the HV system, wherein the cooling operation is performed during a plug-in recharging of the HV battery.

10. The method of claim 9, further comprising determining, by the controller, if a plug-in charging rate is being limited due to thermal conditions of the HV system.

11. The method of claim 9, further comprising determining, by the controller, an engine spin speed setpoint to reduce the temperature of the underhood environment, the internal combustion engine, and/or the exhaust system below the predetermined threshold.

12. The method of claim 11, further comprising operating, by the controller, the internal combustion engine in fuel shut-off at the determined engine spin speed setpoint.

13. The method of claim 9, wherein the HV system includes an onboard charger, a plug-in interface, and HV cables.

14. The method of claim 9, wherein during the cooling operation, the motor/generator is powered by the HV battery.

15. The method of claim 13, wherein during the cooling operation, the motor/generator is powered by a grid charger plugged into the plug-in interface.

16. The method of claim 9, wherein the HEV is a series hybrid electric vehicle.

* * * * *